US010210294B1

(12) United States Patent
Corbett (10) Patent No.: US 10,210,294 B1
(45) Date of Patent: Feb. 19, 2019

(54) SYSTEM AND METHODS FOR SIMULATING A CIRCUIT DESIGN (71) Applicant: Xilinx, Inc., San Jose, CA (US)

(72) Inventor: Kyle Corbett, Campbell, CA (US)

(73) Assignee: XILINX, INC., San Jose, CA (US)

( * ) Notice: Subject to any disclaimer, the term of this patent is extended or adjusted under 35 U.S.C. 154(b) by 698 days.

(21) Appl. No.: 14/795,624

(22) Filed: Jul. 9, 2015

(51) Int. Cl.
G06F 17/50 (2006.01)
G01R 31/3183 (2006.01)

(52) U.S. Cl.
CPC ...... *G06F 17/5036* (2013.01); *G06F 17/5022* (2013.01); *G01R 31/318342* (2013.01); *G01R 31/318364* (2013.01); *G06F 17/5009* (2013.01); *G06F 17/5031* (2013.01)

(58) Field of Classification Search
None
See application file for complete search history.

(56) References Cited

U.S. PATENT DOCUMENTS

| 5,650,938 | A  | * | 7/1997  | Bootehsaz | G01R 31/318357 703/19 |
| 5,905,883 | A  | * | 5/1999  | Kasuya    | G06F 17/5022 703/17 |
| 7,089,135 | B2 | * | 8/2006  | Rajsuman  | G01R 31/31813 702/117 |
| 7,178,115 | B2 | * | 2/2007  | Rajsuman  | G01R 31/318314 716/106 |
| 7,209,849 | B1 | * | 4/2007  | Watanabe  | G01R 31/31919 324/755.01 |
| 7,564,809 | B1 | * | 7/2009  | Manohar   | H04L 41/145 370/310 |
| 7,673,201 | B1 | * | 3/2010  | Chan      | G06F 1/04 326/40 |
| 8,281,279 | B2 | * | 10/2012 | Maloney   | G01R 31/318583 714/726 |
| 8,428,928 | B1 | * | 4/2013  | McGaughy  | G06F 17/5036 703/14 |
| 8,543,953 | B2 | * | 9/2013  | Boehm     | G06F 17/5022 703/16 |
| 8,650,519 | B2 | * | 2/2014  | Boehm     | G06F 17/5022 714/30 |
| 8,775,987 | B1 |   | 7/2014  | Donlin et al. | |
| 8,813,005 | B1 | * | 8/2014  | Dao       | G06F 17/5022 716/102 |
| 9,053,263 | B2 | * | 6/2015  | Hu        | G06F 17/5009 |
| 9,443,108 | B1 | * | 9/2016  | Roth      | G06F 21/70 |
| 2002/0133325 | A1 | * | 9/2002 | Hoare, II | G06F 17/5009 703/17 |

(Continued)

Primary Examiner — Kibrom K Gebresilassie
(74) Attorney, Agent, or Firm — John J. King (57) ABSTRACT A method of enabling a simulation of a circuit design is described. The method comprises generating, using a computer, an initial representation of the circuit design; simulating the circuit design using the initial representation by driving input signals to the circuit design based upon a simulation event listing; capturing event data associated with a plurality of timestamps in a first file while simulating the circuit design; identifying a plurality of events associated with a timestamp of a plurality of timestamps; reordering events of the plurality of associated with the timestamp; and generating a replay module used to drives input signals to the circuit design. A system for enabling a simulation of a circuit design is also described.

20 Claims, 9 Drawing Sheets (56) References Cited

U.S. PATENT DOCUMENTS

| | | | |
|---|---|---|---|
| 2004/0024578 A1* | 2/2004 | Szymanski | G06F 17/5009 703/17 |
| 2004/0148153 A1* | 7/2004 | Beletsky | G06F 17/5027 703/27 |
| 2005/0036512 A1* | 2/2005 | Loukianov | H04J 3/0632 370/469 |
| 2005/0071791 A1 | 3/2005 | Buckley, Jr. | |
| 2006/0074622 A1* | 4/2006 | Scott | G06F 11/3636 703/23 |
| 2008/0172217 A1 | 7/2008 | Morizawa | |
| 2008/0288234 A1 | 11/2008 | Nelson et al. | |
| 2013/0061190 A1* | 3/2013 | Boehm | G06F 17/5022 716/108 |
| 2013/0061191 A1* | 3/2013 | Boehm | G06F 17/5022 716/113 |

\* cited by examiner

Original Simulation

Initial begin
    clk = 1'b1
    dut_in = 1'b1
    #5
    clk = 1'b0
    #5
    clk = 1'b1
    #5
    clk = 1'b0    802
    #5
    dut_in = 1'b1
    clk = 1'b1
    #5
    clk = 1'b0
    #5
    clk = 1'b1
    #5
    clk = 1'b0
    #5
    clk = 1'b1
    #5
    clk = 1'b0    806
    #5
    clk = 1'b1
    dut_in = 1'b0
    #5
    clk = 1'b0
    #5
    clk = 1'b1
    #5
    Finish;
End Re-ordered Simulation Initial begin
    clk = 1'b1
    dut_in = 1'b1
    #5
    clk = 1'b0
    #5
    clk = 1'b1
    #5
    clk = 1'b0    804
    #5
    clk = 1'b1
    #1
    dut_in = 1'b1
    #4
    clk = 1'b0
    #5
    clk = 1'b1
    #5
    clk = 1'b0
    #5
    clk = 1'b1
    #5
    clk = 1'b0    808
    #5
    clk = 1'b1
    #1
    dut_in = 1'b0
    #4
    clk = 1'b0
    #5
    clk = 1'b1
    #5
    Finish;
End

SYSTEM AND METHODS FOR SIMULATING A CIRCUIT DESIGN

TECHNICAL FIELD

The present invention relates generally to integrated circuit devices, and in particular, to a system for and methods of enabling a simulation of a circuit design to be implemented in an integrated circuit device.

BACKGROUND

Modern integrated circuits (ICs) are developed through the use of hardware description languages (HDLs). HDLs such as VERILOG, VHDL, and the like allow developers to create software-based representations of circuit designs. One advantage of using an HDL is the potential for code reuse from one design to another. This concept has been realized with the commercial availability of intellectual property (IP) cores.

In general, an IP core (hereinafter "core" or "module") refers to a software representation of a semiconductor component that provides a processing function. Different varieties of cores exist. For example, some cores can provide basic functions that can be included in a circuit design or, alternatively, can be used as subcomponents within a larger, more complex core. Another variety of cores can function as a logic bridge to software-based bus objects, such as Peripheral Component Interconnect (PCI) or Advanced Microcontroller Bus Architecture (AMBA) busses.

Some cores are highly configurable and prior to release undergo extensive testing to verify whether or not the core is functionally correct. A common approach to verification of a core is with a testbench. A testbench, also referred to as a verification environment, provides test stimuli and verifies the behavior of a design under test, in this case one or more cores. Generating a testbench involves describing the connections, events, and test vectors for different combinations of transactions involving the one or more cores. A testbench also refers to the code used to create a pre-determined input sequence to the cores, as well as the code responsible for observing the response.

However, the order of events within an event time in an event file associated with testing a core may be non-deterministic. This non-deterministic behavior can cause the generated test vectors to be incorrectly applied, thus causing false negatives in testing the core.

Accordingly, systems for and methods of enabling a simulation of a circuit design using a testbench that account for the timing of events are desirable.

SUMMARY

A method of enabling a simulation of a circuit design is described. The method comprises generating, using a computer, an initial representation of the circuit design; simulating the circuit design using the initial representation by driving input signals to the circuit design based upon a simulation event listing; capturing event data associated with a plurality of timestamps in a first file while simulating the circuit design; identifying a plurality of events associated with a timestamp of a plurality of timestamps; reordering events of the plurality of events associated with the timestamp; and generating a replay module used to drive input signals to the circuit design.

Another method of enabling the simulation of a circuit design comprises generating, using a computer, an initial representation of the circuit design; simulating the circuit design using the initial representation by driving input signals to the circuit design based upon a simulation event listing; capturing events associated with a plurality of timestamps in a first file while simulating the circuit design; identifying a plurality of events associated with a timestamp of a plurality of timestamps; scheduling a first event of the plurality of events after the timestamp; inserting a new timestamp after the first event of the plurality of events; and scheduling a second event of the plurality of events after the new timestamp.

A system for testing a circuit design is also described. The system comprises a processor; a memory arrangement coupled to the processor and configured with program code, the program code, when executed by the processor, causing the processor to perform operations including: simulating the circuit design using the initial representation by driving input signals to the circuit design based upon a simulation event listing; capturing events associated with a plurality of time stamps while simulating the circuit design; identifying events associated with a timestamp of a plurality of timestamps; reordering the events associated with the timestamp; and generating a replay module that drives input signals to the circuit design.

Other features will be recognized from consideration of the Detailed Description and the Claims, which follow.

DETAILED DESCRIPTION

Simulation of a high definite language (HDL) code has two types of time, including timestamps that are measured in units of real time (i.e. nanoseconds, picoseconds), and delta/simulation steps, where no units are used for event scheduling within the simulator. When using timestamps, events that happen at the same time are captured in the same timestamp. However, delta steps, or the order of events between two timestamps, are not captured. While different simulation tools will produce the same events at the same timestamp when a particular simulation standard is applied, the order of the events produced within that timestamp, where events can be value changes for example, can be different.

The methods set forth below enable a simulation of a circuit design where events between timestamps can be placed in as desired order to avoid false negatives during the simulation. The methods remove the non-deterministic behavior of conventional simulators writing out the event file by ensuring the correct order of the input signals. When these events are transformed into a replay module, the replay module may incorrectly apply the input signals. That is, though an actual event time and signal transition is captured correctly for the timestamp, the re-application order of the events in a resultant replay module may produce false negatives. The methods set forth below prevent false negatives by ensuring that an event applied as a stimulus during testing will be applied at the correct time.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
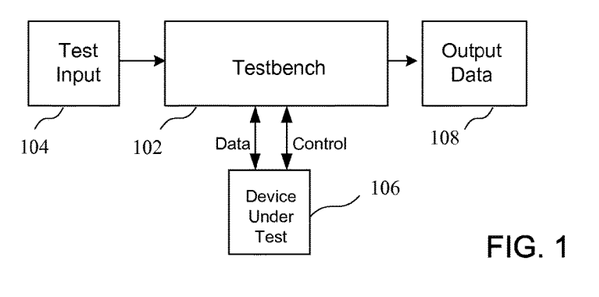
FIG. 1 is a block diagram of a testbench arrangement for testing integrated circuit devices.

Turning first to FIG. 1, a block diagram of a testbench arrangement for testing integrated circuit devices is shown. In particular, testbench 102 receives a test input 104 comprising test data and/or configuration data for a device under test (DUT) 106 and generates output data 108. The testbench 102 couples data and control signal to and receives return data and control signals from the device under test 106. The return data may comprise a test output from the device under test provided to the test equipment. The test output will generally provide information verifying circuit elements in the device under test. As will be described in more detail below, the embodiments of the present invention provide information related to an integrated circuit, such as an IP core implemented in a programmable logic device.

Figure 2:
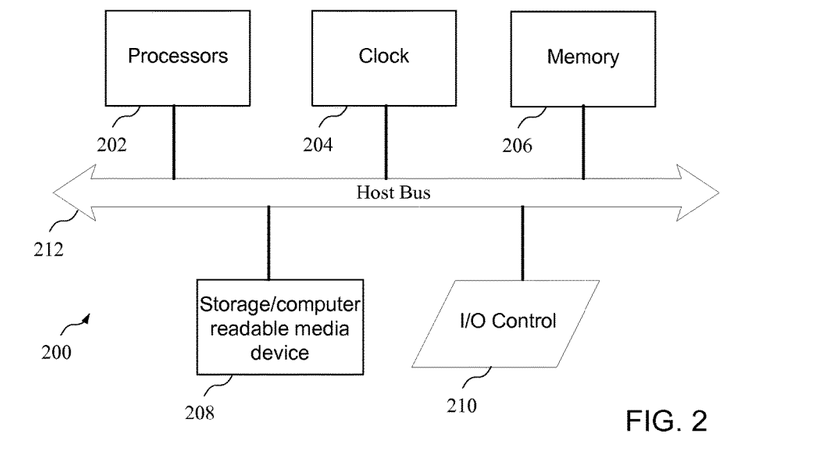
FIG. 2 is a block diagram of a system for testing a circuit design using the testbench arrangement of FIG. 1.

Turning now to FIG. 2, a block diagram of a system for testing a circuit design using the testbench arrangement of FIG. 1 is shown. FIG. 2 shows a block diagram of an example computing arrangement that may be configured to implement the data structures and perform the operations of the processes described herein, and may be implemented in the testbench 102. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 200 includes one or more processors 202, a clock signal generator 204, a memory arrangement 206, a storage arrangement 208, and an input/output control unit 210, all coupled to a host bus 212. The arrangement 200 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 202 may be one or more general purpose processors, or a combination of one or more general purpose processors and suitable co-processors, or one or more specialized processors (e.g., RISC, CISC, pipelined, etc.).

The memory arrangement 206 typically includes multiple levels of cache memory, and a main memory. The storage arrangement 208 may include local and/or remote persistent storage, such as provided by magnetic disks (not shown), flash, EPROM, or other non-volatile data storage. The storage unit may be read or read/write capable. Further, the memory arrangement 206 and storage arrangement 208 may be combined in a single arrangement.

The processor(s) 202 executes the software in storage arrangement 208 and/or memory arrangement 206, reads data from and stores data to the storage arrangement 208 and/or memory arrangement 206, and communicates with external devices through the input/output control unit 210. These functions are synchronized by the clock signal generator 204. The resource of the computing arrangement may be managed by either an operating system, or a hardware control unit.

Figure 3:
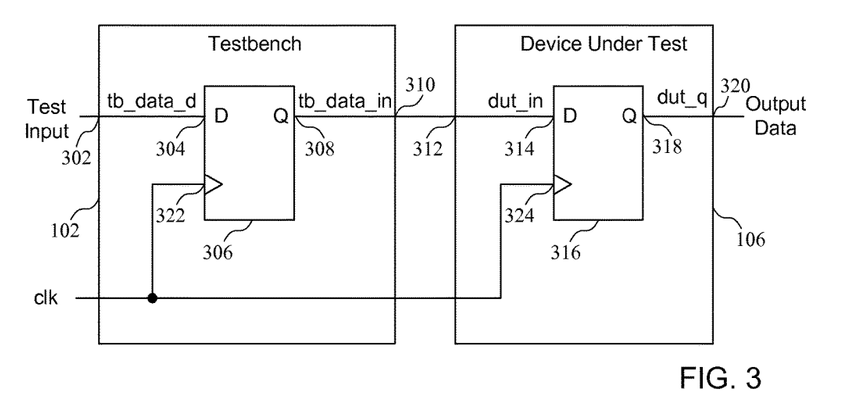
FIG. 3 is a block diagram showing elements of a testbench and a device under test that generate output data in response to test inputs.

Turning now to FIG. 3, a block diagram showing elements of a testbench and a device under test that generate output signals in response to test inputs is shown. More particularly, the system of FIG. 3 comprises a testbench 102 driving test inputs to the device under test 106 having a flip-flop. The testbench the DUT are preferably driven by the same clock (clk) and may be sampled on the positive edge of the clock. More particularly, test input data is applied to an input 302 (shown here as tb_data_d), and is applied to an input 304 of a flip-flop 306. The data at the output 308 (shown here as tb_data_in) is driven from an output 310 of the testbench to the device under test 106 at a data input 312 (shown here receiving the dut_in input signal). That is, the dut_in signal is coupled to the data input 314 of a flip-flop 316, where the output dut_q is generated at an output 318 of the flip-flop and provided as output data at an output 320 of DUT 106. It should be noted that the circuits of the testbench and the device under test are provided by way of example for purposes of showing the timing of signals in the system of FIG. 1, and how the methods set forth below enable test input signals to be applied in the proper order to avoid errors during simulation testing. It should be understood that both the testbench and the device under test would have many more circuit elements.

Figure 4:
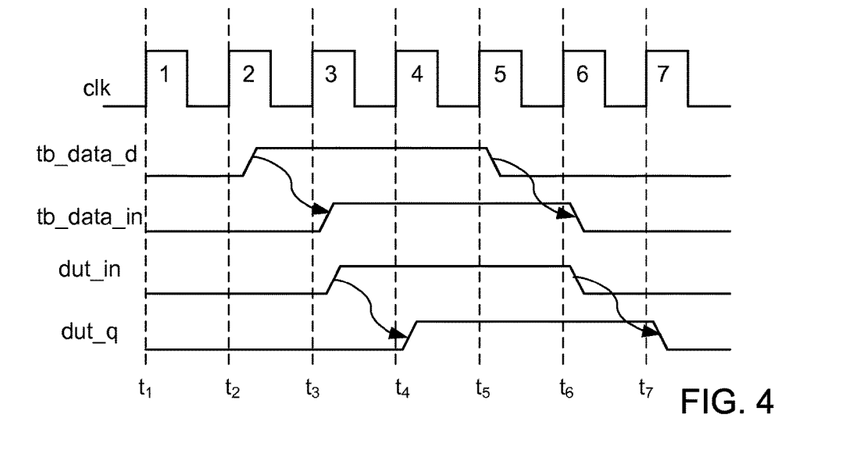
FIG. 4 is a timing diagram showing waveforms having a desired clock-to-output delay.
Figure 5:
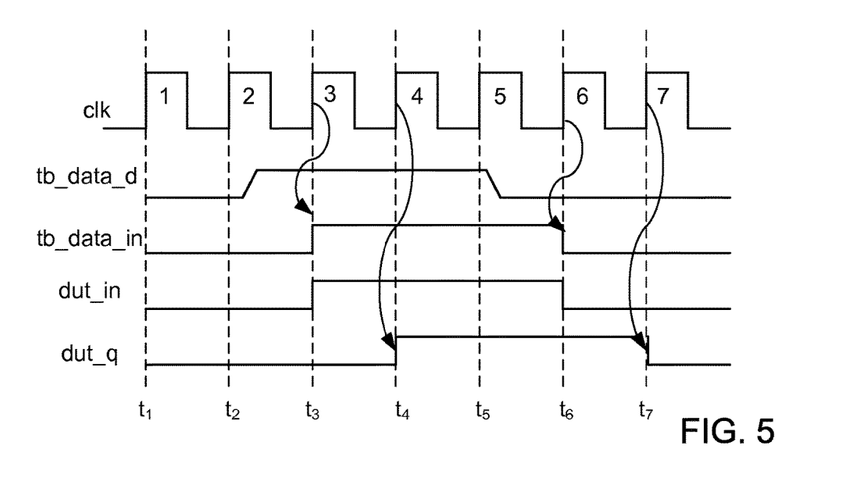
FIG. 5 is a timing diagram showing actual waveforms having necessary physical delays during simulation.
Figure 6:
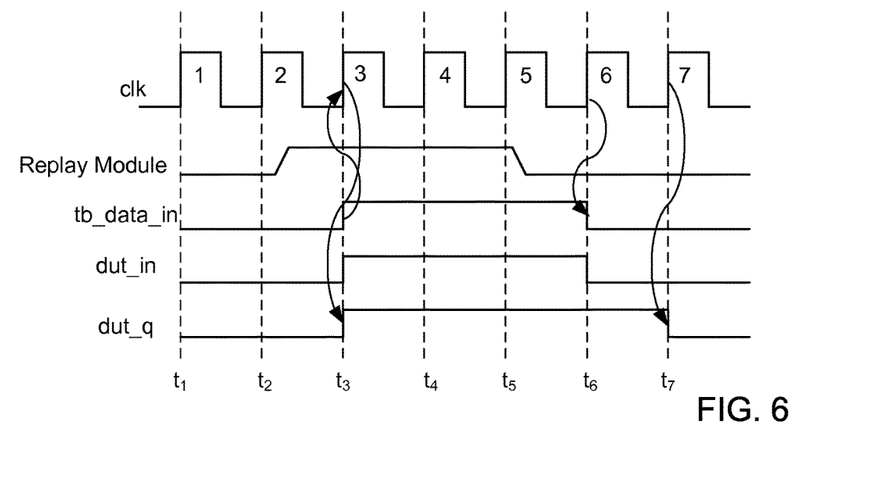
FIG. 6 is a timing diagram showing actual waveforms during simulation with zero delays.

FIGS. 4-6 show different timing diagrams to illustrate an example of how different inputs may lead to errors during simulation testing when not applied in the correct order. The timing diagram of FIG. 4 shows waveforms of a desired clock-to-output delay. That is, the desired waveform of FIG. 4 shows physical (inertial) delays that will only exist if implicitly coded into the test code, such a register transfer language (RTL) test code. FIG. 5 shows the actual waveform during simulation with zero delays, where the results are the same (e.g. dut_q follows dut_in after a 1 clock cycle delay). The transitions of the tb_data_in and the positive edge of the clock occur in the same timestamp (i.e. the rising edge of the clock signal).

FIG. 6 in provided to shown how the order of multiple events associated with a timestamp can result in erroneous outputs if the events are not applied in the correct order. A simulator determines an event order based on the HDL coding constructs. However, the input events that occur within the same timestamp may actually be scheduled in a different order then what is written in the event list for that timestamp. Only the inputs to the DUT are required for the generation of the replay module, as will be described in more detail in reference to FIG. 8. As shown in the waveform of FIG. 6, the dut_in signal is provided at the same time as the rising edge of the clock signal (i.e. the rising edge of pulse 3). Without any delay provided between the clock signal and the dut_in signal, the output dut_q transitions high at the rising edge of the clock pulse 3, rather than the rising edge of the clock pulse 4. Therefore, the simulation result will not be the expected result, leading to an erroneous indication of an error during simulation.

Figure 7:
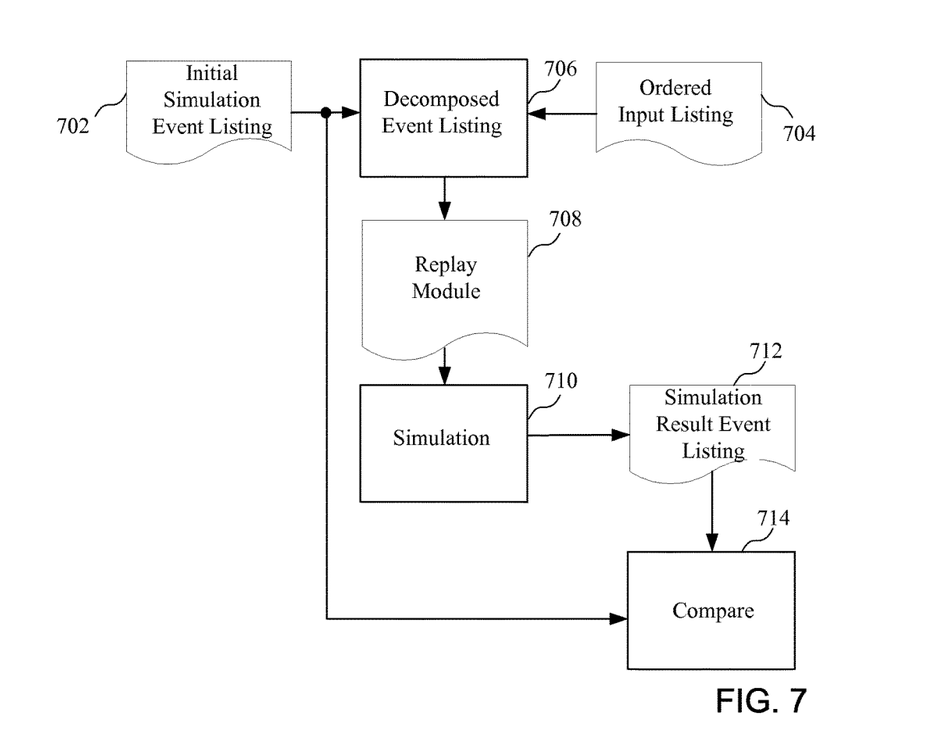
FIG. 7 is a block diagram showing a method of simulating a circuit design using an ordered input listing.

Turning now to FIG. 7, a block diagram shows a method of simulating a circuit design using an ordered input listing. An original simulation event listing 702 and an ordered input listing 704 are used to create a decomposed event listing 706. That is, in additional to events associated with a timestamp that are provided in the simulation event listing 702, the order of information provided in the ordered input listing ensure that events occur during the simulation in the correct order. For example, because the VCD and eVCD format defined in the IEEE 1364-2005 does not define the order of the events within the same simulation timestamp written out to the file, timing errors can occur as described in reference to FIG. 6. A value change dump (VCD) file is in an ASCII-based format and includes a series of time-ordered value changes for the signals in a given simulation model. The VCD includes a sequence of timestamps, the signals whose values change are listed (e.g., value/id pair) with each timestamp. Because the order of events within a timestamp in the event file is non-deterministic, events can occur in the wrong order. Therefore, the ordered input listing 704 can provide the correct order for events, where the events are decomposed in to early events (which may be clock signals for example) and late events (which may be other signals, such as test input signals). While the examples of FIGS. 4-6 relate to a single clock signal, it should be understood that they could relate to multiple clock signals, where early signals could relate to the different clock signals, and the other signals could relate to different test signals associated with the multiple clock signals. The ordered input listing could be a comma separated value (CSV) file, for example.

If clock or sampling input information is available, then it can be used to influence the order of the events at a timestamp to allow for the correct generation of the stimulus. A replay module 708, generated based upon the decomposed event listing as will be described in more detail below, relies on accurately reproducing the inputs to the HDL because any ambiguity can cause the replay to apply the events in a different order than that performed by the original simulation. When more information is known about the design it is possible to ensure the same ordering of the sampling events. For example, it is possible to provide information regarding which signals are the clock signals and which are data to enable the event order to be "synthesized" when generating a reply module. The replay module can now accurately replay the events to the DUT. After a simulation is performed at a block 710, a simulation result event listing 712 is created. The simulation result event listing 712 is compared to the original simulation event listing 702 at a block 714. The comparison at the block 714 enables determining whether an error occurred in the simulation. The comparison at the block 714 can occur at any stage of the design implementation process, as will be described in more detail in reference to FIG. 10.

Figure 8:
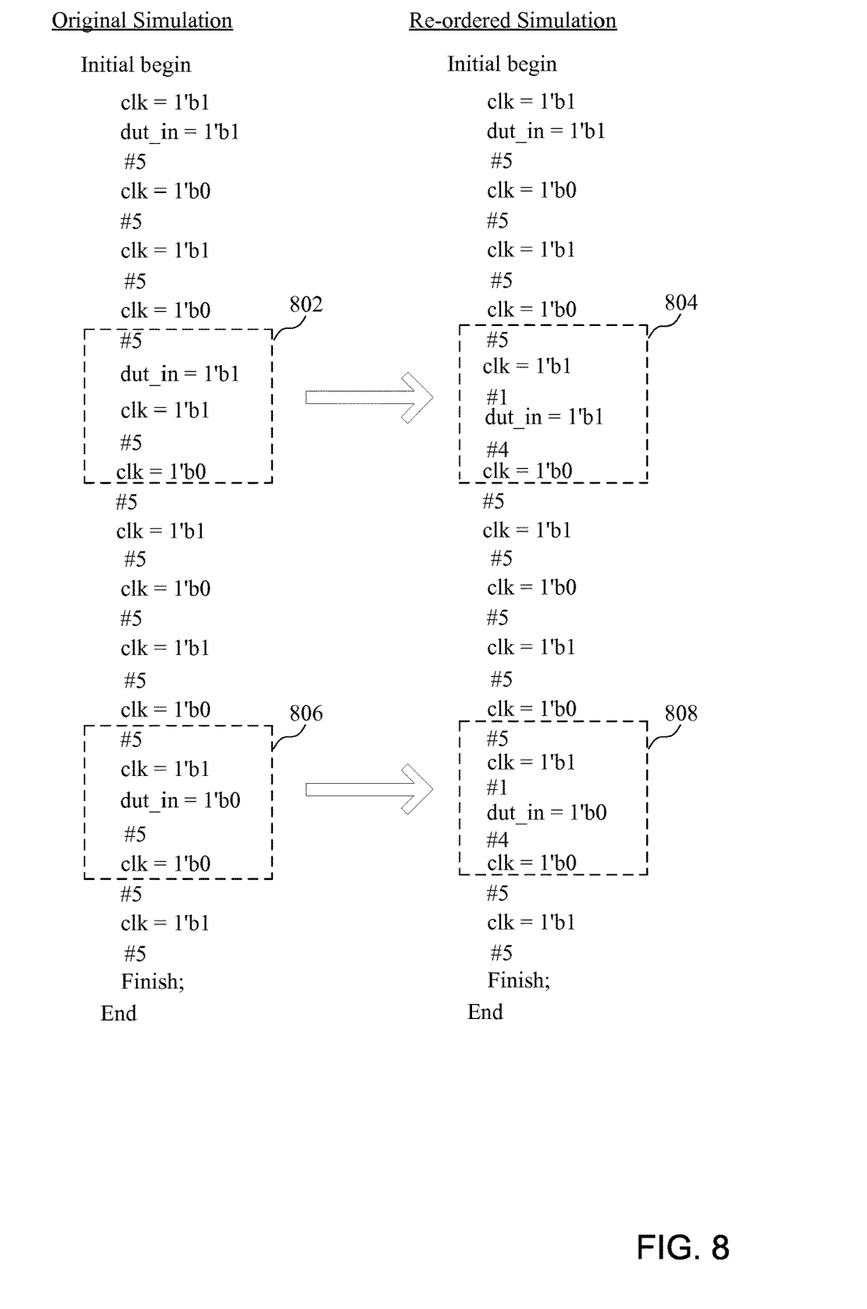
FIG. 8 is a diagram showing the reordering of events of a simulation.

Turning now to FIG. 8, a diagram shows the reordering of events of a simulation. All of the events exist within a given timestamp (represented by a # symbol followed by a number indicating a delay time). However, the ordering of events of the original simulation may not match the order of the events within the event timestamp. If the events within the event time are "replayed" on a device under test as written, it may produce incorrect results. That is, the information about the event order of the timestamp is lost, leading to errors in the simulation.

In the example of FIG. 8, the dut_in signal is applied in the portion of events of the replay module before the clk edge signal is received as shown in the portions of events 804, causing the error. Accordingly, the order of the clock input (clk=1'b1) and the signal input (dut_in=1'b1) is changed, as shown in the portion of events 804 of the re-ordered simulation. Further, a delay, designated by #1, is provided between the clk=1'b1 and dut_in=1'b1 signals, and a delay #4 is provided after the dut_in=1'b1 signal. It should be noted that the one unit delay of #1 and the 4 unit delay of #4 is equal to the 5 unit delay of #5, which is equal to the original #5 delay after the dut_in=1'b1 and clk=1'b1 signals of the order of events 802 in the original simulation.

In the portion of events 806 of the original simulation, the order of the events clk=1'b1 and dut_in=1'b0 is correct. However, a delay is created between the signals to ensure correct simulation. In particular, a delay of one time unit is provided by the inclusion of #1 after clk=1'b1 and before dut_in=1'b0 in the order of events 808. The remaining delay before the next clock signal is provided by the inclusion of #4 after the dut_in=1'b0. Accordingly, not only can the order of events be changed for the re-ordered simulation, but delays can be added between events to ensure proper timing of the simulation.

Therefore, as described above in reference to FIG. 8, each timestamp is divided into two groups, such as early inputs and late inputs. In some implementations, early inputs could be input clocks, and late inputs could be other input signals. This grouping is based on the original simulation event listings, where the order within the replay module is based on the information provided in the ordered input listings. The order within the "other input signals" does not to be modified. For each timestamp, the input clocks are written to the replay module first followed by "other input signals". A "synthesized" inertial delay may be added between the "Input clocks" and "other input signals," where the timestamp time is divided into two parts: first one of length 1 unit and second with (Timestamp[n+1]−Timestamp[n]−1). In the example of the change of the order of events in the portion of events 802 to the order of events in the portion of events 804, the rising edge of the clock occurs at the same timestamp as before, however, a new inertial delay of 1 unit has been added. This delay is represented by a new timestamp (i.e. #1 in the order of events 804) being introduced after the clk=1'b1, and the "other inputs" are applied at the new timestamp #1. While only one input signal is shown with a clock signal between timestamps, it should be understood that multiple input signals be associated with a given clock signal between time stamps, where the additional input signals would be placed after the clock signal.

Therefore, the replay module based upon the re-ordered simulation of FIG. 8 enables recreating the same set of events when using the replay module in the same order as in an original simulation used to create the replay module. Information about the signal order relative to the sampling clock can be lost during simulation. With extra information provided either by the user or extracted from the design HDL in the ordered input listing, the input signals can be separated into two groups which can enable reestablishing the timing information lost at the boundary of the DUT.

Figure 9:
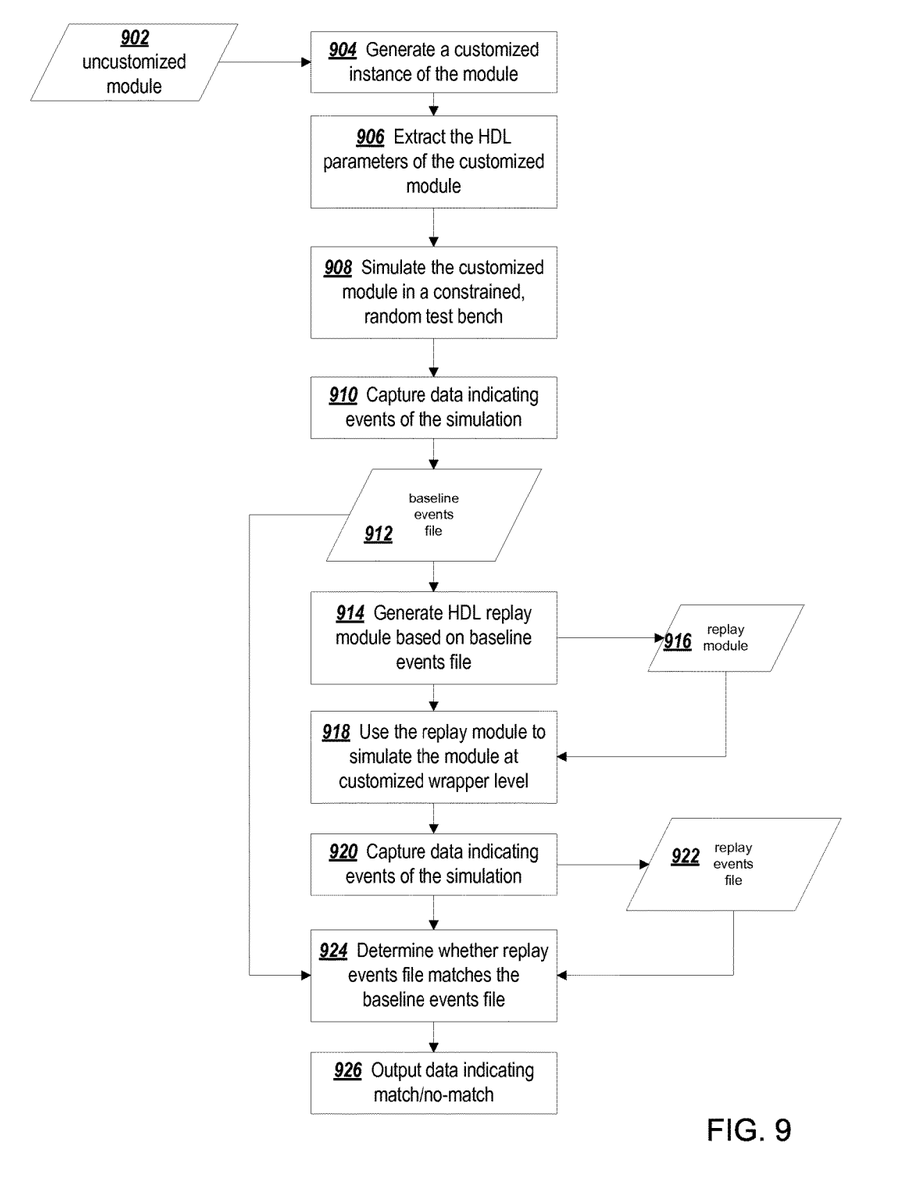
FIG. 9 is a flowchart of a process for verification of a module using a replay module.

Turning now to FIG. 9, a flowchart of a process for verification of a module using a replay module is shown. Block 904 generates a customized instance of an uncustomized module 902. The uncustomized module may be a core selected by a designer and customized for use as a component in a larger circuit design. The customized instance may include values of parameters as specified by the designer.

Some tools isolate the designer from the details of the hardware description language (HDL) implementation of the cores that are available for use in a circuit design. Such tools may further support the customization of the parameter values in a manner that hides the actual HDL parameter values of the underlying core. At block 906, the values of those HDL parameters are extracted from the customized module, and the extracted HDL parameter values are used to create an HDL wrapper around the module.

At block 908, the customized HDL module (with the wrapper) is simulated in a constrained, random testbench. The simulation input may be constrained to ranges or distributions of values, and the values may be generated pseudo-randomly subject to the constraints. The results of the simulation are captured at block 910 and stored as events in a baseline events file 912. In an example implementation, the baseline events file may be a VCD file as recognized by those skilled in the art.

At block 914, an HDL replay module 916 is generated from the baseline events file. The HDL replay module contains a module declaration with output ports declared according to the ports of the module that should be driven during the test. The time-ordered port transition events from the baseline events file are re-created by writing the appropriate HDL statements into the body of the code block in the HDL replay module. The proper timing of the events is retained by inserting delay statements into the body of the HDL replay module. Though the replay module may become large, it is relatively simple to compile and inexpensive to execute during simulation.

Selection of the subset of data from the baseline results file for translation into the replay module is made based on the information carried in the header of the baseline results file. In the header, the port names, dimensions, and signal directions are declared. This information indicates those data items in the baseline results file to be added to the replay module as port assignments and delays. Example 1 below shows an example of a baseline results file.

$scope module testbench $end
$scope module DUT $end
$var port 1 <0 aclk $end
$var port 1 <1 aresetn $end
$var port 1 <2 aclken $end
$var port 1 <3 s_axis_tvalid $end
$var port 1 <4 s_axis_tready $end
$var port [23:0] <5 s_axis_tdata $end
$var port [2:0] <6 s_axis_tstrb $end
$var port [2:0] <7 s_axis_tkeep $end
$var port 1 <8 s_axis_tlast $end
$upscope $end
$upscope $end
$enddefinitions $end
0
$dumpports
pX 6 6 <4
pZ 0 0 <3
pZ 0 0 <8

Example 1

The correctness of the replay module may be verified, beginning at block 918. At block 918, the module under test (with the wrapper) is simulated using the replay module to drive input signals. At block 920, the simulation data is captured and stored as a VCD replay events file 922.

Block 924 determines whether or not the replay events file matches the baseline events file, and block 926 outputs data indicating whether the files match or do not match. Matching files indicates that the replay module is an accurate recreation of the base set of stimuli (from block 908), which were known to indicate proper functioning of the module.

The replay module offers several benefits. Since the replay module provides an accurate recreation of a set of randomized stimuli for which the module under test was known to pass, the replay module may be used at various stages of the implementation process. Also, since the replay module contains relatively primitive HDL statements it is easily compiled and efficient to run in simulators that do not support advanced testbench language constructs. Also, license fees may be saved because special simulators are not required to simulate the module with advanced testbench languages.

Figure 10:
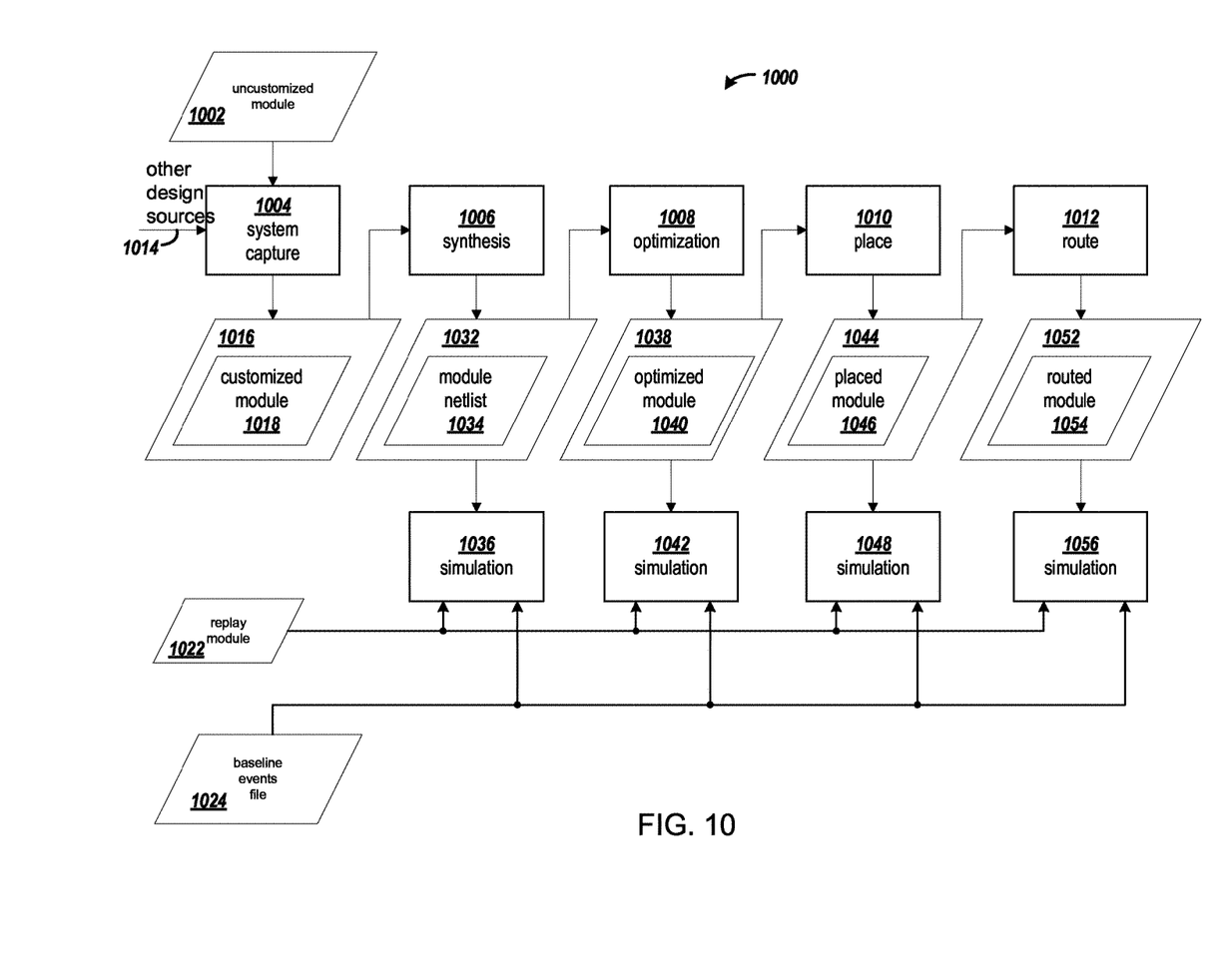
FIG. 10 is a dataflow diagram that shows the use of the replay module in a verification of a module in multiple stages of a design process.

Turning now to FIG. 10, a dataflow diagram shows the use of the replay module in verification of a module in multiple stages of a design process 1000. The stages of the design process generally include system capture 1004, synthesis 1006, optimization 1008, place 1010, and route 1012, as would be recognized by those skilled in the art. An uncustomized module 1002 is input to a system capture tool 1004. A designer operating a system capture tool can create a circuit design 1016 by customizing the uncustomized module and using other design sources 1014. Such other design sources include other cores and objects from a library of circuit design resources. Along with other design objects, the circuit design 1016 includes customized module 1018, which has designer-provided parameter values applied to the uncustomized module 1002. Using the process described in FIG. 9, the baseline events file 1024 may be generated by simulating the customized module 1018 and the replay module 1022, which was previously generated from the baseline events file.

The circuit design 1016 and customized module 1018 are synthesized in synthesis stage 1006. The synthesized design 1032 includes module netlist 1034, which is the synthesized version of the customized module 1018. The synthesized design and module netlist are input to a netlist simulation 1036. The netlist simulation 1036 performs the process shown in FIG. 11.

Figure 11:
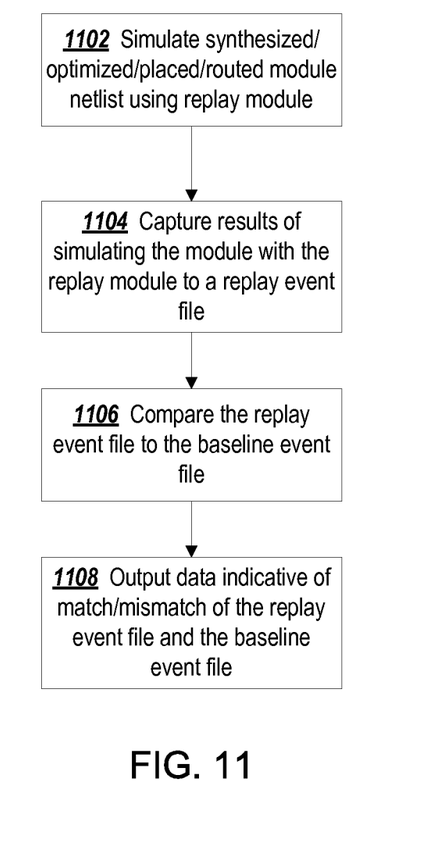
FIG. 11 is a flowchart of a process for simulating a module under test using a replay module and verifying whether or not simulation of the module under test produced correct results.

Turning now to FIG. 11, a flowchart shows a process for simulating a module under test using a replay module and verifying whether or not simulation of the module under test produced correct results. The same general process of FIG.

11 is performed in each of the simulations 1036, 1042, 1048, and 1056 shown in FIG. 10, and the flowchart of FIG. 11 symbolizes the processing in each of those simulations.

At block 1102, the module is simulated using the replay module. Depending on which of the simulations 1036, 1042, 1048, and 1056 is being performed, the module that is simulated is one of the modules having been synthesized, optimized, placed, or routed. The results of the simulation are captured to a replay event file at block 1104. The replay event file may be a VCD file as described above.

The replay event file is compared to the baseline event file at block 1106 to determine whether or not the results of the simulation in the current implementation phase (synthesis, optimization, place, or route) match the results of simulating the customized module (FIG. 9, block 908). At block 1108, the process outputs data that indicates whether or not the replay events file matched the baseline events file.

Returning now to FIG. 10, following the synthesis stage 1006, the circuit design may be submitted to optimization stage 1008 for optimization. The result of optimization is an optimized netlist 1038, which includes the optimized module 1040. Optimized module 1040 is an optimized netlist of the module under test. The simulation 1042 simulates the optimized module 1040 using the replay module 1022 and determines whether or not the optimized module simulated correctly by comparing the generated replay events file to the baseline events file 1024, as described in FIG. 11.

Following optimization, the circuit design may be submitted to stage 1010 for placing the optimized netlist. A placed circuit design 1044 is generated, and the placed circuit design includes placed module 1046, which is a placed netlist version of the module under test. The simulation 1048 simulates the placed module 1046 using the replay module 1022 and determines whether or not the placed module simulated correctly by comparing the generated replay events file to the baseline events file 1024, as described in FIG. 11.

Following placement, the circuit design may be submitted to stage 1012 for routing the placed netlist. A routed circuit design 1052 is generated, and the routed circuit design includes routed module 1054, which is a routed netlist version of the module under test. The simulation 1056 simulates the routed module 1054 using the replay module 1022 and determines whether or not the routed module simulated correctly by comparing the generated replay events file to the baseline events file 1024, as described in FIG. 11.

The process of determining whether or not the baseline events file matches a replay events file involves determining whether the events in the replay events file match or correspond to the events in the baseline events file. Since the process may be applied at different stages of the design process, a direct comparison of value change timestamps and values may not be sufficient. As the module proceeds through the design process, the times of events may drift from the times of the corresponding events in the baseline events file. For example, additional simulated delays may occur in netlist style simulations as RTL statements are eventually mapped to logical primitives, which intrinsically have unit or back-annotated delays.

Figure 12:
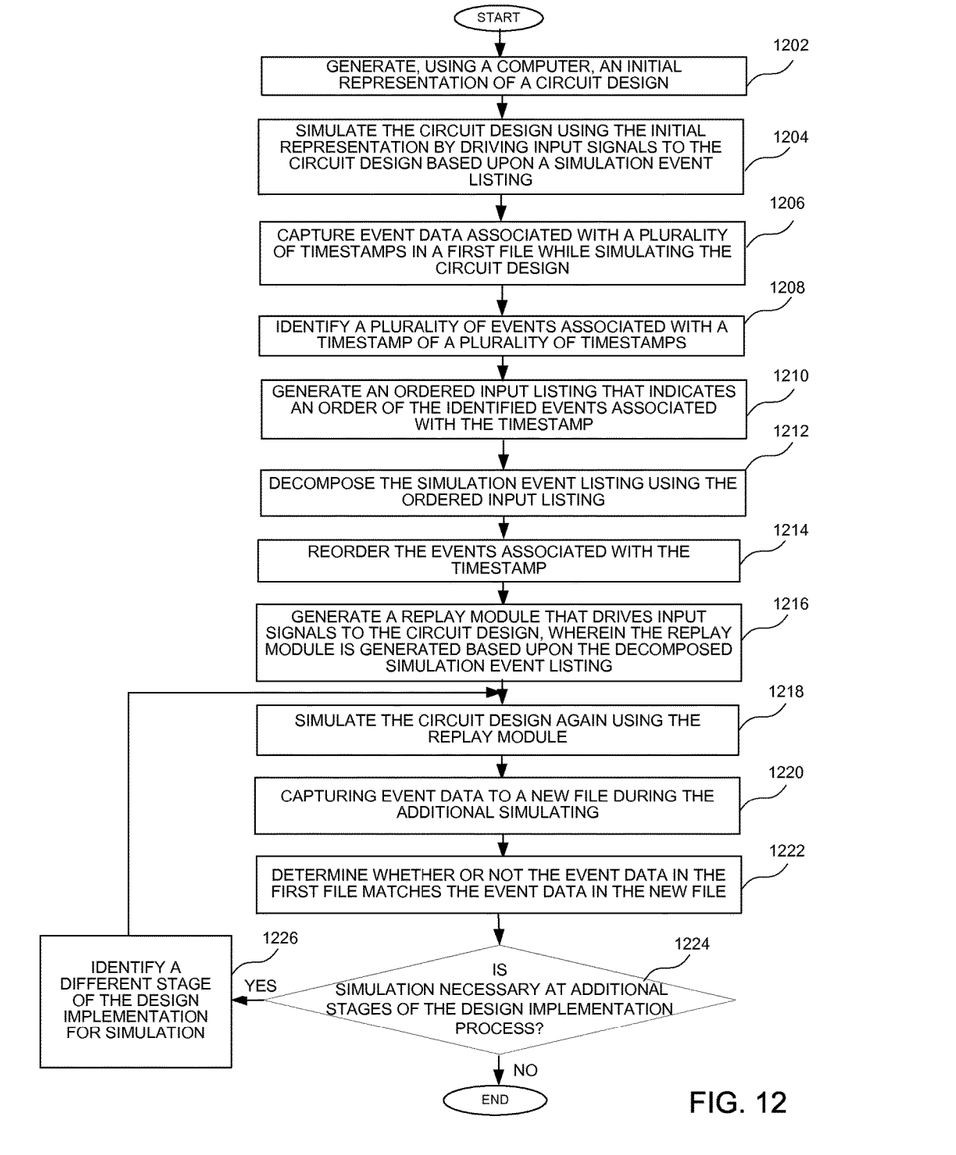
FIG. 12 is a flow chart showing a method of enabling a simulation of a circuit design.

Turning now to FIG. 12, a flow chart shows a method of enabling a simulation of a circuit design. In particular, an initial representation of the circuit design is generated, using a computer, at a block 1202. It should be noted that generating an initial representation of the circuit design at block 1202, as well as the other blocks of FIGS. 12 and 13 could be performed a computer implementing the testbench, such as the computer arrangement 200 of FIG. 2. The circuit design is simulated using the initial representation by driving input signals to the circuit design based upon a simulation event listing at a block 1204. Event data associated with a plurality of timestamps is captured in a first file while simulating the circuit design at a block 1206. A plurality of events associated with a timestamp of a plurality of timestamps is identified at a block 1208. An ordered input listing that indicates an order of the identified events associated with the timestamp is generated at a block 1210. The ordered input listing could be the ordered input listing 704 of FIG. 7, for example. The simulation event listing is decomposed using the early event listing at a block 1212, wherein the replay module is generated based upon the decomposed simulation event listing. The events associated with the timestamp are reordered at a block 1214, as described above in reference to FIG. 8, for example. A replay module that drives input signals to the circuit design is generated at a block 1216, wherein the replay module is generated based upon the decomposed simulation event listing.

The circuit design is simulated again using the replay module at a block 1218. Event data is captured to a second file during the second simulating at a block 1220. The first file may be a baseline event file, while the second file may be a replay event file, where the first and second files could be stored in the memory arrangement 206, for example. It is then determined whether or not the event data in the first file matches the event data in the second file at a block 1222. It is also determined whether simulation is necessary at additional stages of the design implementation process at a block 1224. If additional simulations are necessary, the circuit design is simulated again using the replay module and capturing event data to another file at a block 1226. The simulating of the circuit design again could comprise simulating the module during a design implementation at each of the synthesis, optimization, placement, and routing stages of the design implementation process of FIG. 10.

Figure 13:
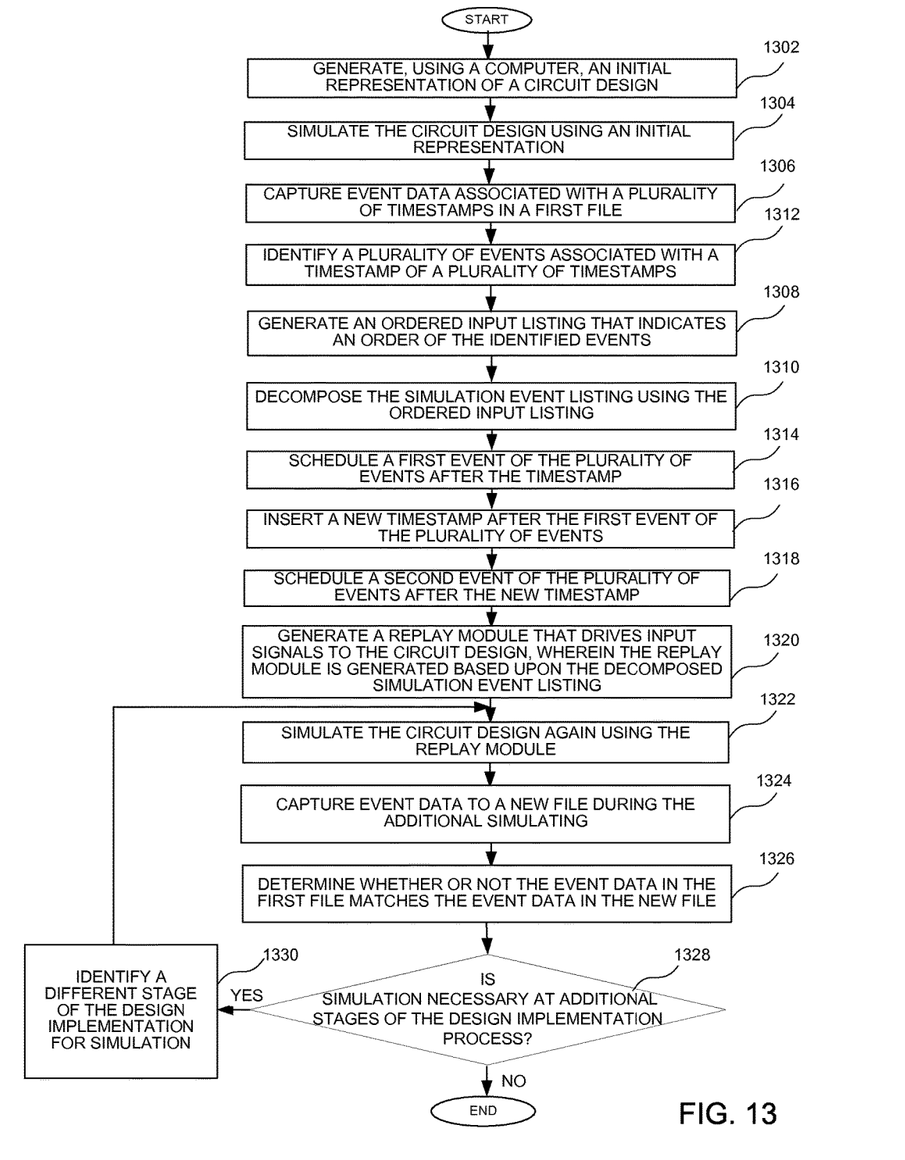
FIG. 13 is a flow chart showing another method of enabling a simulation of a circuit design.

Turning now to FIG. 13, a flow chart shows another method of enabling a simulation of a circuit design. In particular, an initial representation of the circuit design generating, using a computer, at a block 1302. The circuit design is simulated using the initial representation by driving input signals to the circuit design based upon a simulation event listing at a block 1304. Events associated with a plurality of timestamps in a first file, which may be a baseline file for example, are captured while simulating the circuit design at a block 1306. A plurality of events associated with a timestamp of a plurality of timestamps is identified at a block 1308. An ordered input listing that indicates an order of the identified events associated with the timestamp is generated at a block 1310. Generating an ordered input list may comprise dividing events associated with a timestamp as early events and late events, for example. The simulation event listing is decomposed using the early event listing at a block 1312, where a replay module can be generated based upon the decomposed simulation event listing.

A first event of the plurality of events is scheduled after the timestamp at a block 1314. A new timestamp is inserted after the first event of the plurality of events at a block 1316. A second event of the plurality of events is scheduled after the new timestamp at a block 1318. The placement of the first and second events and the new timestamp may be performed as described above in reference to FIG. 8. It should be noted that the blocks 1312-1318 could be performed for many timestamps, and more particularly, whenever multiple events are associated with a timestamp.

A replay module based upon the decomposed simulation event listing generated at a block 1320. The circuit design is simulated again using the replay module at a block 1322. Event data is captured to a second file during the second simulating at a block 1324. It is then determined whether or not the event data in the first file matches the event data in the second file at a block 1326. If the data does not match, an error signal could be generated, for example. It is also determined whether simulation is necessary at additional stages of the design implementation process at a block 1328. If additional simulations are necessary, the circuit design is simulated again using the replay module and capturing event data to another file at a block 1330. The simulating of the circuit design again could comprise simulating the module during a design implementation process described above in reference to FIG. 10, including synthesis, optimization, placement, and routing.

The various elements of the methods of FIGS. 12 and 13 may be implemented using the circuits of FIGS. 1-11 as described, or using some other suitable circuits. More particularly, each of the elements of FIGS. 12 and 13 could be implemented using a testbench implemented on a computer, such as computer arrangement 202 as described above. While specific elements of the method are described, it should be understood that additional elements of the method, or additional details related to the elements, could be implemented according to the disclosure of FIGS. 1-11.

It can therefore be appreciated that new systems for and methods of enabling a simulation of a circuit design has been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A method of enabling a simulation of a circuit design, the method comprising:
    generating, using a computer, an initial representation of the circuit design;
    simulating the circuit design using the initial representation by driving first input signals to the circuit design of a device under test based upon a simulation event listing;
    capturing event data associated with a plurality of timestamps in a first file while simulating the circuit design;
    identifying a plurality of events associated with a timestamp of a plurality of timestamps;
    reordering events of the plurality of events associated with the timestamp of the plurality of time stamps by providing a delay between a first event and a second event of the plurality of events associated with the time stamp, wherein providing a delay between the first event and the second event prevents false negatives by providing an order to the first event and the second event; and
    generating a module having the reordered events used to drive second input signals to the circuit design of the device under test.

2. The method of claim 1 further comprising generating an ordered input listing that indicates an order of the identified plurality of events associated with the timestamp.

3. The method of claim 2 further comprising decomposing the simulation event listing using the ordered input listing, wherein the module is generated based upon the decomposed simulation event listing.

4. The method of claim 1 further comprising simulating the circuit design a second time using the module.

5. The method of claim 4 further comprising capturing event data to a second file during the second simulating.

6. The method of claim 5 further comprising determining whether or not the event data in the first file matches the event data in the second file.

7. The method of claim 6 wherein simulating the circuit design a second time comprises simulating the circuit design during a design implementation process selected from a group consisting of synthesis, optimization, placement, and routing.

8. A method of enabling the simulation of a circuit design, the method comprising:
    generating, using a computer, an initial representation of the circuit design;
    simulating the circuit design using the initial representation by driving input signals to the circuit design of a device under test based upon a simulation event listing;
    capturing events associated with a plurality of timestamps in a first file while simulating the circuit design;
    identifying a plurality of events associated with a timestamp of a plurality of timestamps;
    scheduling a first event of the plurality of events after the timestamp;
    inserting a new timestamp between the first event and a second event of the plurality of events, wherein inserting a new timestamp between the first event and the second event prevents false negatives by providing an order to the first event and the second event; and
    scheduling a second event of the plurality of events after the new timestamp.

9. The method of claim 8 further comprising generating an ordered input listing that indicates an order of the identified plurality of events associated with the timestamp.

10. The method of claim 9 further comprising decomposing the simulation event listing using the ordered input listing, and generating a module based upon the decomposed simulation event listing.

11. The method of claim 10 further comprising simulating the circuit design a second time using the module and capturing event data to a second file.

12. The method of claim 11 wherein simulating the circuit design a second time comprises simulating the circuit design during a design implementation process selected from a group consisting of synthesis, optimization, placement, and routing.

13. The method of claim 8 further comprising dividing the events associated with the timestamp as early events and late events.

14. The method of claim 8 wherein identifying a plurality of events associated with a timestamp of a plurality of timestamps comprises identifying a plurality of events between the timestamp and a next timestamp, wherein the new timestamp is inserted between the timestamp and the next timestamp.

15. A system for enabling a simulation of a circuit design, the system comprising:
    a processor;
    a memory arrangement coupled to the processor and configured with program code, the program code, when executed by the processor, causing the processor to perform operations including:
        simulating the circuit design using an initial representation by driving first input signals to the circuit design of a device under test based upon a simulation event listing;
        capturing events associated with a plurality of timestamps while simulating the circuit design;

identifying events associated with a timestamp of a plurality of timestamps;

reordering the events associated with the timestamp of the plurality of time stamps by providing a delay between a first event and a second event of the plurality of events associated with the time stamp, wherein providing a delay between the first event and the second event prevents false negatives by providing an order to the first event and the second event; and generating a module used to drive second input signals to the circuit design of the device under test.

16. The system of claim 15, the operations further including generating an ordered input listing that indicates an order of the identified events associated with the timestamp.

17. The system of claim 16, the operations further including decomposing the simulation event listing using the ordered input listing, wherein the module is generated based upon the decomposed simulation event listing.

18. The system of claim 15, the operations further including simulating the circuit design a second time using the module, and capturing event data to a second file.

19. The system of claim 18, the operations further including determining whether or not the event data in the first file matches the event data in the second file.

20. The system of claim 18, wherein simulating the circuit design a second time comprises simulating the circuit design during a design implementation process selected from a group consisting of synthesis, optimization, placement, and routing.

* * * * *